June 26, 1956 W. T. BARKER 2,751,809
HOLLOW RIVET AND EXPANDER PIN HAVING CURVED ENGAGING SURFACES
Filed May 5, 1952 3 Sheets-Sheet 1

INVENTOR.
WILLIAM T. BARKER
BY William R. Lane
ATTORNEY

June 26, 1956  W. T. BARKER  2,751,809
HOLLOW RIVET AND EXPANDER PIN HAVING CURVED ENGAGING SURFACES
Filed May 5, 1952  3 Sheets-Sheet 2

INVENTOR.
WILLIAM T. BARKER
BY William R. Lane
ATTORNEY

United States Patent Office 2,751,809
Patented June 26, 1956

2,751,809

HOLLOW RIVET AND EXPANDER PIN HAVING CURVED ENGAGING SURFACES

William T. Barker, Los Angeles, Calif., assignor to North American Aviation, Inc.

Application May 5, 1952, Serial No. 286,192

7 Claims. (Cl. 85—40)

This application is a continuation in part of application Serial No. 235,227, filed July 5, 1951, and now abandoned, for High Strength Blind Rivet, which is a continuation in part of application Serial No. 136,504, filed January 3, 1950, and now abandoned, for High Strength Blind Rivet, both in the name of William T. Barker.

This invention relates to a rivet of the so-called blind type.

It is an object of this invention to provide a rivet which can be driven from one side and in places where its other side is inaccessible.

It is a further object of this invention to provide a rivet of this type having high tensile and shearing strengths, and fatigue resisting properties.

An additional object of this invention is to provide a convenient method and means for providing a bushing in a workpiece.

Still another object of this invention is to provide a bushing that is capable of fastening workpieces together in addition to acting as a bushing.

Other objects of invention will become apparent from the following description taken in connection with the accompanying drawings, in which—

Figure 1:
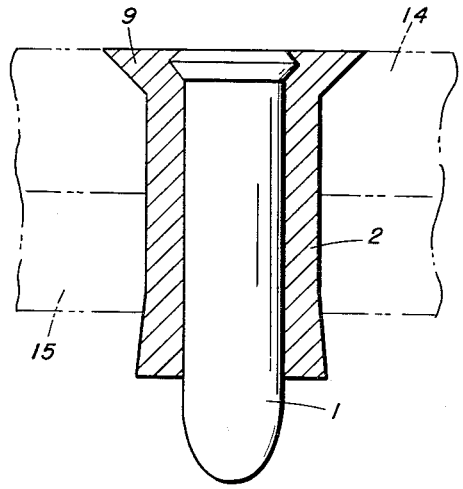
Fig. 1 is an elevation, partly in section, showing the rivet in assembled position.
Figure 2:
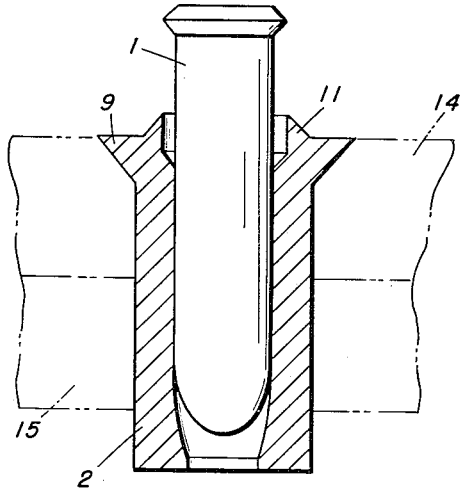
Fig. 2 is a view, partly in section, illustrating the parts of the rivet prior to driving.
Figure 3:
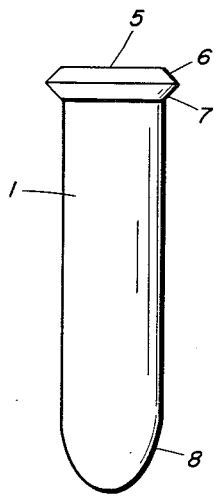
Fig. 3 is an elevational view of the pin portion of the rivet.
Figure 4:
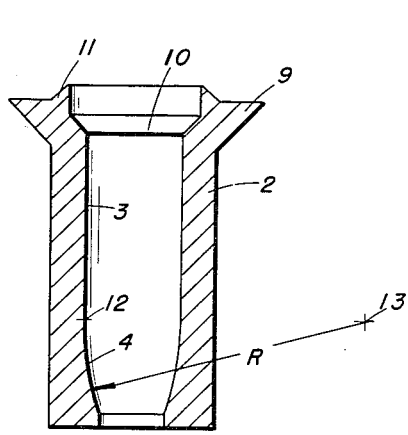
Fig. 4 is a sectional view of the collar portion of the rivet.

Referring to the drawings, the invention comprises essentially a pin 1 and a collar 2. These are adapted for fastening together plate members 14 and 15. The pin 1 is composed of hardened material, such as steel or the like, having a head portion 5 provided with tapered surfaces 6 and 7 and an end portion 8 which is predeterminately curved. This curve is preferably of the second degree, such as parabolic, but may assume other inwardly curved forms if desired. The collar member 2 is generally tubular in shape and is provided with a cylindrical surface 3 which joins a curved portion 4 generated by a radius of preselected length, depending upon the diameter of the rivet.

The collar may be made of steel, preferably stainless steel because of its corrosion resistance, or other desired high-strength material. This provides, therefore, a blind rivet that may give the high shearing resistance provided by both a steel collar and a steel pin, plus the high tensile strength of a continuous tubular steel collar. To allow expansion of the collar, conventional blind rivets of this type provide either a collar of relatively weak, soft material or a steel collar that is split at one end, which therefore sacrifices strength in tension. It is possible to use both a steel collar and a steel pin through the provisions of my improved rivet by which the collar is cold-worked as it is expanded when the joint is formed. A particular difference in the curvature of the lower end of the pin and the bottom interior of the collar, as will be more fully explained, provides this necessary cold working.

The collar is provided with a flanged portion 9 for countersinking purposes, although an ordinary head may be used if desired. There is also provided in the upper portion of the collar a recessed portion 10 corresponding to the surface 7 of the pin 1, and a flange 11 adapted to be peened over surface 6 of pin 1 when the rivet is in driven position. The center of curvature of surface 4 is so placed that the thickness of the tubular portion of collar 2 increases very slightly from the junction of surfaces 3 and 4 at 12 to a maximum at the lower portion of the collar member. The point of tangency 12 and the center of curvature 13 are predeterminately located above the bottom of the collar so that the curve generated by radius R results in the interior of the collar being decreased in diameter from the point 12 to the lower end of the collar. Point 12 is selected so that it is a material distance from the bottom of plate 15, depending upon the size of the rivet, the tolerances, plate thickness, and the like. By reason of this construction there obtains a circumferential line contact between the lower engaging surface of pin 1 and the surface 4 as it passes point 12. This engagement during the driving operation integrates the material of the collar and plate 15, while at the same time cold working the collar material. The line contact engagement of the bottom of the surface 8 of pin 1 and the surface 4 changes to area contact as driving progresses, but the curves are so coordinated that the reaction line, which is normal to the curves at the point of tangency of the surfaces 4 and 8, is always within prescribed limits. This reaction line may be resolved into a vertical and horizontal component of force, being vectorially and the resultant of the force exerted by the pin on the collar. The vertical component tends to cause the collar member to elongate or neck down, whereas the horizontal component tends to move the material of the collar horizontally outward to make the surface 4 conform to the cylindrical surface 3. Curved surfaces 4 and 8 are so selected that the normal to the curves at the point of tangency results in the desired lateral movement of material while at the same time keeping the vertical component of force within the elastic limit of the material. The stress created by this horizontal component of force exceeds the elastic limit of the material to thereby move it laterally into rivet-setting position. As the pin 1 moves downwardly the point of tangency of surfaces 8 and 4 changes so that the line normal to the curves at the point of tangency makes a smaller angle with the center line of the collar. This results in relatively larger vertical components as the rivet is driven. However, the collar can carry these greater loads without necking down or without exceeding the elastic limit of the material by reason of the fact that it has been cold worked in the driving operation and integrated with plate 15. Lateral movement of the collar material initially fills up the hole in the lower plate member and then expands under the lower plate. This expansion increases progressively during the driving of the pin with the result that collar member 2 is firmly fastened with respect to plate 15.

Figure 5:
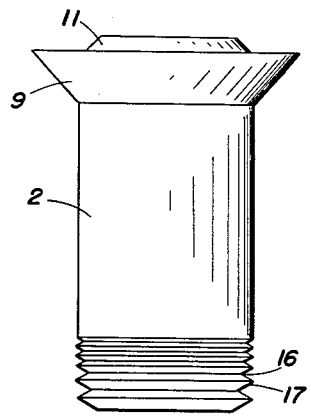
Fig. 5 is an elevation of the collar portion of the rivet when provided with grooves.
Figure 6:
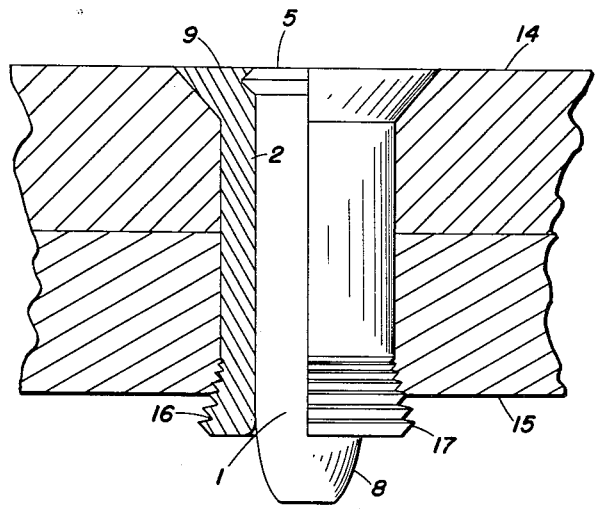
Fig. 6 is an elevation, partly in section, showing a rivet having a collar provided with grooves when in assembled position.

To increase the strength of a joint secured by this rivet, there may be provided a plurality of grooves 16 extending circumferentially around the exterior of the lower portion of collar 2 as illustrated in Figs. 5 and 6. In the preferred embodiment, these grooves become progressively deeper towards the bottom of the collar and are V-shaped, thus forming teeth 17. When pin 1 is driven into the collar, teeth 17 will be forced into contact with plate 15 and thereby provide a stronger gripping action between the collar and the plate.

The use of grooves on the exterior of the collar will greatly increase the yield strength of the rivet in straight tension as where forces perpendicular to plates 14 and 15 are pulling the plates apart. In addition, the grooves will provide a lap joint with greater resistance to shear, because in every shearing stress there is a certain amount of tension present. Teeth 17 by more securely gripping plate 15 will also give a joint better fatigue-resisting characteristics.

Providing the rivet with teeth of another contour, knurling the exterior of the rivet, or some further variation of the serrations illustrated, may of course be employed in increasing the strength and utility of this rivet.

In the final part of the driving operation the rivet hammer peens flange 11 over the end of the head 5 into engagement with surface 6 thereof. This serves to fasten the pin and collar in place in the collar. The pin and collar are preferably lubricated by means of a graphite lacquer, mutton tallow, or the like, to protect them from corrosion and to facilitate driving.

In the operation of the device the collar is placed in aligned openings in plates 14 and 15. These openings are usually somewhat oversize within permitted tolerances. The pin is then placed in the collar and driven therein by one or more blows of a suitable tool, such as a rivet gun, hammer, or the like. In the initial contact of the lower part of the cylindrical portion of the rivet with the curved part 4 of the collar, circumferential line contact obtains. The reaction line of these forces is normal to the curves at the point of tangency of the curves and extends at a substantial angle with respect to the vertical, thereby resulting in a large horizontal component of force and a relatively small vertical component of force. The relative position of the reaction line varies during the driving operation as contact between the pin and collar changes from line to area, and further as the area changes. At all times, however, this reaction line remains at a substantial angle to the vertical so as to result in a larger horizontal than vertical component of force. Movement of material will occur in the general direction of the reaction line, i. e., in a horizontal direction, although not following this line exactly. This is because the curves are so selected that the horizontal component of resulting stress exceeds the elastic limit of the material, whereas the vertical component is within the elastic limit of the material. This causes the material of the collar to assume the shape of the pin while the contact between the pin and the curved portion of the collar varies as driving progresses. The reaction of the driving force is, of course, at the center of the area of this contact and normal thereto. This reaction line will tend to make a smaller angle with the vertical as driving of the pin progresses. Initially, material is moved to fill up the tolerance between the collar and the openings in the plates. When the reaction line clears the juncture of the collar and the lower portion of the plate, material flows outwardly underneath the plate to firmly fasten the collar with respect thereto. By reason of the area contact, material continues to flow laterally as the pin is driven downwardly, thereby moving sufficient material immediately under the plate 15 to result in a satisfactory clinching action. In the embodiment provided with grooves 16, the teeth 17 will at this time be in engagement with and gripping portions of plate 15 as shown in Fig. 6. By reason of the fact that the two surfaces are curved, a relatively small driving force is required. However, this driving force is progressively effective by reason of the fact that there is initial line contact between the surfaces, and the line contact progresses to area contact which in turn increases in size until the driving operation is completed. This increase in area, however, does not materially increase the driving force required, since the resistance of the material to lateral movement decreases as the pressure area between the curved surfaces tends to clear the bottom of plate 15.

It may be observed that this rivet normally projects only a short distance below plate 15 and thus provides a large amount of clearance beyond the rivet along the blind side, unlike other rivets of this type. In fact this rivet may be used with the collar entirely within the openings in the plate, which feature is particularly useful where a blind hole is required as, for example, where the opening does not extend entirely through plate 15. In such cases the collar and the openings are so arranged that, upon driving of the pin, the lower portion of the collar will be forced tightly against the surface of the opening and provide a secure gripping action for holding the plates together.

Figure 7:
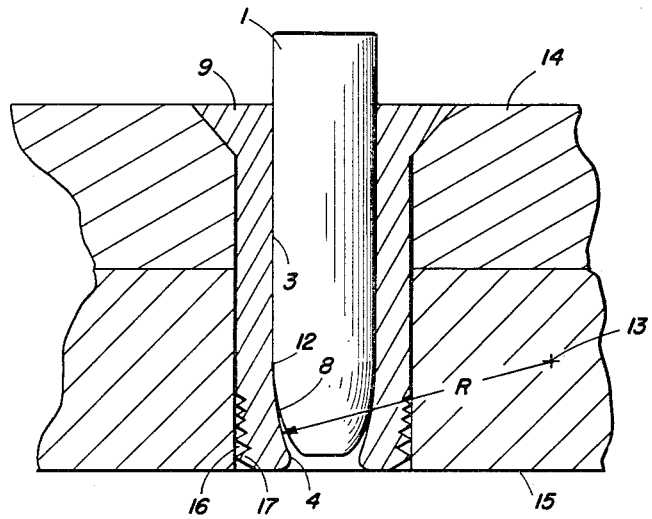
Fig. 7 is a sectional view of a modification where the rivet may serve as a bushing.
Figure 8:
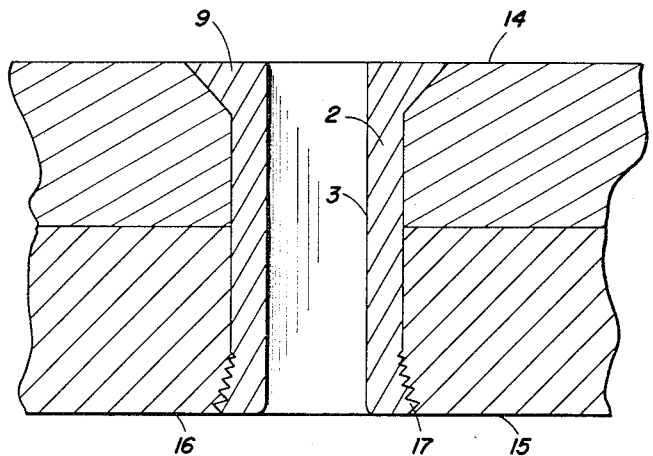
Fig. 8 is a sectional view of the modification of Fig. 7 installed.

An important modification of this invention is illustrated in Figs. 7 and 8 in which sleeve 2 is made to serve as a bushing. The sleeve may be used to secure parts together if so desired or it may be used solely as a bushing. The pin and the sleeve for this modification are much the same as described in the other modifications. Sleeve 2 normally includes a flanged head 9 as before and if it appears necessary may be provided with grooves 16 forming teeth 17 to supply a firm gripping action. The curvature of portion 4 of the sleeve and of lower end 8 of the pin are the same as previously set forth. However, no flange 11 need be provided on the sleeve and pin 1 will not be provided with a head 5. The sleeve may be of steel material as preferred for the other modifications, or it may be of a suitable bearing material such as bronze if desired. Bearing material will, of course, not offer the strength of steel and the latter material may be preferred where the sleeve acts as a rivet to secure the parts together.

In utilizing this modification of the invention sleeve 2 is inserted in a substantially complementary opening in a workpiece in the usual manner. The work may comprise two or more plates such as 14 and 15 illustrated in the drawings in which case sleeve 2 will act as a rivet holding the plates together after its installation is complete. However, the work may consist of a single piece if desired in which event the sleeve does not act as a rivet but is merely utilized as a bushing. Figs. 7 and 8 show an installation where the bottom of sleeve 2 is flush with the bottom of the lower plate 15. This may be preferred but it is possible to have the bottom of the sleeve projecting beyond the bottom plate if so desired. After the sleeve has been inserted into the opening in the work, pin 1 is inserted into the sleeve as shown in Fig. 7. The pin is then driven all the way through the sleeve and out on the bottom side. This expands the exterior surface laterally into a gripping engagement with the workpiece so that sleeve 2 is firmly located within the opening. In addition, driving the pin through the sleeve expands the interior of the sleeve so that the sleeve assumes a constant interior diameter which is suitable as a bushing surface. The sleeve thus becomes a bushing as illustrated in Fig. 8.

In some instances it may be necessary to provide a bushing in a blind hole where the opening does not go all the way through the workpiece so that the pin cannot be driven through the sleeve and out on the opposite side. In such cases it is possible, by using a slightly longer pin, to drive the pin all the way into the sleeve thereby expanding the interior and exterior surfaces so that the sleeve is held within the opening in the work and so that the interior diameter of the sleeve is made uniform, and subsequently pull the pin out of the sleeve leaving only a bushing member within the blind hole.

Although the invention has been described and illus-

I claim:

1. In combination with work to be riveted having an aperture therein, a rivet comprising a continuous hollow tubular collar member of relatively hard material having an exterior surface substantially complementary to said aperture whereby said collar is adapted for insertion therein, and a head portion larger than said aperture for engagement with said work around said aperture; and a pin of relatively hard material adapted to be driven in said collar for expanding the same, the interior of said collar being substantially cylindrical for a portion of its length, and of a slightly inwardly curved contour tangential to said cylindrical portion for another portion of its length through which said pin is to be driven, the equivalent center of curvature of said curved portion being within the axial limits of said collar and radially remote from the exterior thereof, said pin having a cylindrical portion substantially complementary to said collar cylindrical portion, and an inwardly curved end portion of sharper curvature than said curved portion of said collar tangential to the cylindrical portion of said pin, said curves being thereby correlated to provide initial line contact at said tangential portions between said pin end and said curved collar surface when said pin is driven into said collar whereby said inwardly curved portion of collar is expanded radially when said pin is driven therein.

2. A device as recited in claim 1 in which said collar and said aperture are substantially circular in cross section.

3. A rivet comprising a continuous tubular collar of relatively hard material having an exteriorly projecting head portion at one end and a substantially cylindrical exterior for the remainder of its length; and a pin member of relatively hard material adapted to be driven into said collar for radially expanding portions thereof, the interior of said collar being substantially cylindrical from said end thereof and at the opposite end portion being of continuously decreasing diameter defining a slightly curved surface tangential to said cylindrical portion, the equivalent center of curvature of said curved surface being within the axial limits of said collar and radially remote from the exterior thereof, said pin member having a substantially cylindrical exterior for a major portion of its length, said exterior being substantially complementary to said cylindrical portion of said collar interior, one end of said pin having a continuously decreasing diameter defining a curved surface tangential to the cylindrical portion thereof and of sharper curvature than said curved surface of said collar interior for thereby providing initial contact between said curved surfaces of said pin and said collar along said tangential portions thereof when said pin is driven into said collar and permitting said pin to radially expand said curved portion of said collar.

4. A device as recited in claim 3 in which the exterior of the end portion of said collar opposite said head portion is provided with groove means therein for providing a gripping means between said collar and work with which said collar is associated.

5. A rivet comprising a continuous tubular steel collar, and a pin adapted to be driven into said collar for expanding the same, said collar having radially projecting head portions at one end thereof and a substantially cylindrical exterior of the remainder of its length, the interior of said collar extending substantially cylindrically from said end thereof, and at the opposite end through which said pin is to be driven being of continuously decreasing diameter defining a slightly curved surface tangential to said cylindrical portion, the equivalent center of curvature of said curved surface being within the axial limits of said collar and remote from said exterior of said collar, said pin having head portions at one end thereof and a substantially cylindrical exterior extending from said end of said pin to the opposite end portion thereof, said cylindrical exterior being substantially complementary to said cylindrical portion of said collar interior, said opposite end portion of said pin having a continuously decreasing diameter defining a curved surface tangential to the cylindrical portion thereof, and of sharper curvature than said curved surface of said collar interior, whereby when said pin is inserted in said collar the initial contact between said opposite end portions of said pin and said collar is along said tangential portions, said pin being of a length relative to said collar such that upon such initial contact said head of said pin is axially spaced from said head of said collar, whereby driving of said pin into said collar causes said collar to expand radially at said opposite end thereof, and brings said head of said pin into engagement with said head of said collar, said collar having axially extending flange portions at said head thereof adapted to be bent over said head of said pin when said pin has been so driven into said collar for retaining said pin within said collar.

6. A device as recited in claim 5 including in addition a lubricant interposed between said pin and said collar for facilitating movement of said pin into said collar.

7. A rivet comprising a continuous tubular collar of relatively hard material adapted to be inserted in work to be riveted, and a pin member of relatively hard material adapted to be driven into said collar for expanding the same, said collar having a substantially cylindrical exterior for a major portion of its length, and a projecting head portion at one end thereof, the interior of said collar being substantially cylindrical for a major portion of its length and at the end thereof remote from said head portion having an inwardly directed portion through which said pin is to be driven, said inwardly directed portion having a relatively slight curvature circumferentially tangential to said cylindrical portion thereof, the equivalent center of curvature of said inwardly directed portion being within the axial limits of said collar and radially remote from the exterior thereof, said pin member having a substantially cylindrical exterior for a major portion of its length, said exterior being substantially complementary to said cylindrical portion of said collar interior, one end of said pin having a substantially paraboloidal contour circumferentially tangential to the cylindrical portion thereof and having a sharper curvature than said spherical surface of said collar, whereby when said pin is driven into said collar the initial contact between end of said pin and said collar obtains substantially along said circumferential locations of tangency.

References Cited in the file of this patent

UNITED STATES PATENTS

| 547,988 | Bull | Oct. 15, 1895 |
| 1,372,291 | Jacobs | Mar. 22, 1921 |
| 1,392,108 | Bilterman | Sept. 27, 1921 |
| 1,413,998 | Templeton | Apr. 25, 1922 |
| 2,264,747 | Fether | Dec. 2, 1946 |

FOREIGN PATENTS

| 100,164 | Australia | Feb. 4, 1937 |
| 563,295 | Great Britain | Aug. 8, 1944 |
| 909,215 | France | May 2, 1946 |